UNITED STATES PATENT OFFICE.

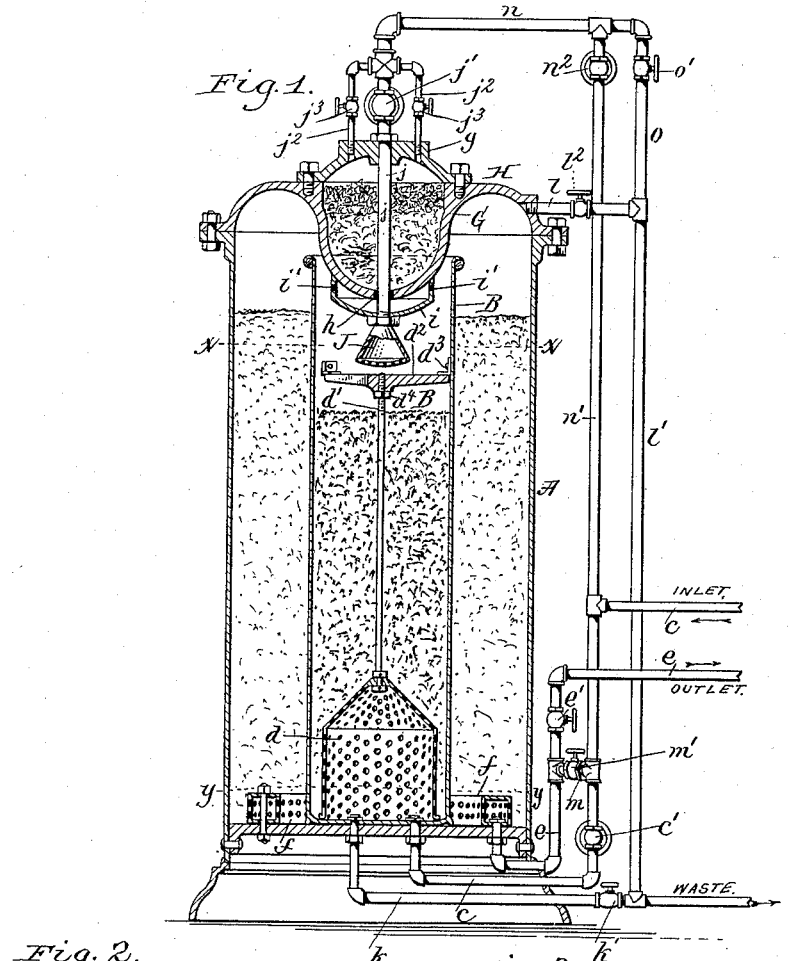

JAMES CARTER, OF LOCKPORT, NEW YORK.

PRESSURE-FILTER.

SPECIFICATION forming part of Letters Patent No. 430,797, dated June 24, 1890.

Application filed February 15, 1890. Serial No. 340,504. (No model.)

*To all whom it may concern:*

Be it known that I, JAMES CARTER, a citizen of the United States, residing at Lockport, in the county of Niagara and State of New York, have invented new and useful Improvements in Pressure-Filters, of which the following is a specification.

This invention relates to a pressure-filter, and has for its object to produce an efficient filter of this class, which will operate for a considerable time without becoming clogged, and to construct the filter in such manner that it may be readily and thoroughly cleansed without incurring an unnecessary waste of water.

In the accompanying drawings, Figure 1 is a sectional elevation of my improved filter. Figs. 2 and 3 are horizontal sections thereof in lines $x\ x$ and $y\ y$, Fig. 1, respectively.

Like letters of reference refer to like parts in the several figures.

A represents the main vessel of the filter.

B is an upright cylindrical column or chamber arranged centrally within the casing and made of considerably smaller diameter than the casing, so as to leave a wide annular space between the inner wall of the vessel and the column. This space is filled nearly to the top of the column with fine sand or other filtering medium, which forms the main filter-bed. The column B rests with its closed lower end upon the bottom of the casing A and is open at its upper end. This column is filled to within a short distance of its top with coarse sand, gravel, or other filtering medium, constituting an inner filter-bed, which retains the coarser impurities contained in the water.

$c$ represents the main inlet or supply pipe, which enters the bottom of the column B, and is provided with a stop-cock $c'$ for controlling the flow of the water to the filter.

$d$ is a strainer arranged upon the bottom of the column B over the mouth of the inlet-pipe $c$, and which intercepts the coarse impurities in the water entering the column and divides the water into numerous fine streams, so as to prevent the same from forming channels or passages in the inner filter-bed. The strainer $d$ preferably consists of a perforated cylinder or cage, which is held in place by an upright rod $d'$, secured at its lower end to the strainer and provided at its upper end with a spider or radial arms $d^2$, which engage under lugs or ears $d^3$, formed on the inner side of the column B. The upper end of the rod $d'$ is screw-threaded and arranged in a smooth opening in the spider, and a jam-nut $d^4$ is applied to the threaded portion thereof and bears against the under side of the spider, so as to firmly hold the strainer against the bottom of the column B. Upon turning the spider its arms are released from the lugs $d^3$, and the rod, with the strainer, may be removed from the filter for cleaning it. By the construction shown the spider may be removed from the end of the rod $d'$ after turning it, thereby affording access to the column for removing the gravel preparatory to withdrawing the strainer.

$e$ represents the outlet-pipe of the filter, which enters the bottom of the main vessel A, and is connected with an annular strainer $f$, resting upon the bottom of the vessel. This strainer consists of a hollow ring surrounding the column B and provided on its inner and outer sides with perforations. The strainer $f$ prevents the sand in the main filter-bed from passing into the outlet-pipe and causes the water to be delivered into the main filter-vessel in two annular sheets, whereby the formation of direct passages or channels through the outer filter-bed is avoided. The outlet-pipe is provided with a stop-cock $e'$.

G represents a bowl or receptacle arranged in the upper portion of the casing A above the column B, and which is adapted to contain a solution of alumina or any other coagulant. This bowl is preferably formed with the removable cover or top plate H of the filter and is closed at its upper end by a cap $g$. The lower portion of the bowl is filled with sponge or other porous material, upon which the alumina rests in a crystallized form, and the bowl is provided in its bottom with a discharge-opening $h$, through which the liquid alumina drips in small quantities into the water in the column B. The bowl preferably projects a short distance into the upper end of the column B, as shown, sufficient space being left between the bowl and the rim of the column to permit the water to pass from the column into the surrounding main vessel of the filter. The area of this passage or space is preferably about equal to that of the inlet-pipe. By this arrangement the water is discharged at the upper end of the column in a thin annular sheet, thereby distributing the flow of the water uniformly around the mouth of the column.

$i$ represents a distributer arranged on the under side of the bowl G around the discharge-opening thereof, and which consists of a cap provided in opposite sides with a minute opening $i'$, whereby the coagulating liquid is caused to be discharged in small drops.

$j$ is a vertical feed-pipe passing centrally through the bowl G, and provided near its upper end with a stop-cock $j'$ and at its lower end with a rose or spray device J, which is arranged within the upper part of the column B.

$j^2 j^2$ are supply branches connected to opposite sides of the water-pipe $j$ above its stop-cock and entering the top of the bowl G. These branch pipes are each provided with a cock $j^3$. Upon opening the cocks of the feed-pipe $j$ and the supply-pipes $j^2$ a portion of the water in the column B, rising in the pipe $j$, passes into said supply-pipes and flows upon the crystallized alumina in the bowl, forming a coagulating solution, which, after permeating the sponge in the bottom of the bowl, is discharged into the column B.

$k$ represents a main waste-pipe entering the bottom of the column B and having a stop-cock $k'$, and $l$ is a sediment-discharge pipe entering the top of the main filter-vessel A and connected with the waste-pipe $k$ by a pipe $l'$. This sediment-discharge pipe is provided with a stop-cock $l^2$.

$m$ is a short pipe connecting the inlet and outlet pipes $c$ and $e$ and having a cock $m'$.

$n$ is a washing-pipe connected with the upper end of the feed-pipe $j$, and $n'$ is a branch pipe connecting said washing-pipe with the main inlet-pipe $c$.

$o$ is an auxiliary waste-pipe connected with the washing-pipe $n$ beyond the branch pipe $n'$ and leading to the main waste-pipe $k$ by means of the pipe $l'$. The branch pipe $n'$ is provided with a cock $n^2$ and the waste-pipe $o$ with a cock $o'$.

When the filter is in operation, the valves of the inlet and outlet pipes $c$ $e$ are open and the valves of the remaining pipes are closed.
The unfiltered water, entering the bottom of the column or chamber B, passes through the strainer $d$, rises in the column B, flows over the top of the latter into the surrounding vessel A, and is discharged at the bottom of the latter through the strainer $f$ and outlet-pipe $e$. The large impurities in the water are intercepted by the inner gravel filter-bed, while the remaining fine impurities are retained by the outer sand-bed. By causing the inflowing water to ascend in the inner bed the particles of the bed are constantly loosened and prevented from packing in the column, thereby rendering the inner bed less liable to become clogged and requiring less frequent washing thereof.

When the water to be filtered is unusually roily, a small quantity of the coagulant is commingled therewith by opening the valves of the feed-pipe $j$ and branch pipes $j^2$. The impurities are thereby gathered into concretions, in which form they are more effectually intercepted by the filtering medium and separated from the water.

In cleansing the filter, after the same has been used for purifying comparatively clear water, the washing-water is directed downwardly through the inner filter-bed by means of the spray-pipe $j$ by opening the valve of said pipe and those of the branch pipe $n'$ and main waste-pipe $k$ and closing the valves of the auxiliary waste-pipe $o$, inlet-pipe $c$, and outlet-pipe $e$. By thus reversing the direction of the water through the inner main filter-bed the impurities lodging in the strainer $d$, together with those adhering to the inner coarse filter-bed, are carried off to the main waste-pipe without disturbing the outer filter-bed, which latter does not require as frequent washing as the inner bed when the water is clear.

When the filter is used for purifying water which is somewhat roily, it is washed by reversing the flow of water through the main outer bed, causing it to ascend in the outer bed and descend in the inner bed. This is accomplished by closing the valves of the branch supply-pipe $n'$, auxiliary waste-pipe $o$, outlet-pipe $e$, inlet-pipe $c$, sediment-discharge pipe $l$, and opening the valves of the short connecting-pipe $m$ and main waste-pipe $k$. By discharging the water at the bottom of the outer main vessel A in two annular sheets and directing it upwardly toward the top of the column B all parts of the filter are reached by the water and thoroughly cleansed.

When the filter is used upon water containing a still larger percentage of impurities, it is cleansed by directing the washing-water upwardly through the central filter-bed and discharging it through the sediment-pipe $l$ at the top of the filter. For this purpose the valves of the inlet-pipe $c$ and sediment-discharge pipe $l$ are opened and those of the remaining pipes closed.

By my improved arrangement of the cleaning-pipes the filter may be washed in several different ways, according to the condition of the water which is passed through the filter, and either or both filter-beds are thoroughly cleansed in a short time without unnecessary waste of water. In pressure-filters as heretofore constructed clear water could not be obtained in less time than from twenty to thirty minutes after washing the filter, owing to the agitation of the entire filter-bed. In cleaning my improved filter, when the same is used for purifying ordinary water, the outer bed is not at all disturbed, whereby clear water may be obtained in a much shorter time than heretofore.

The rose at the lower end of the feed-pipe *j* serves the double function of spraying water upon the central filter-bed in washing the same and preventing the filtering material from entering the bottom of the coagulant-receptacle.

I claim as my invention—

1. The combination, with the casing or outer vessel forming an outer filtering-chamber, of a discharge-pipe entering the bottom of the casing, an inner filtering-chamber arranged centrally in the casing and communicating at its top with the outer chamber, an inlet-pipe entering the bottom of said inner chamber, a waste or discharge pipe also entering the bottom of said inner chamber, and a washing-pipe having its mouth above the filter-bed in the inner chamber and connected with the inlet-pipe, substantially as set forth.

2. The combination, with the casing or outer vessel forming an outer filtering-chamber, of a discharge-pipe entering the bottom of the casing, a column or chamber arranged centrally in the casing and forming an inner filtering-chamber, an inlet-pipe entering the bottom of said column, a waste or discharge pipe also entering the bottom of the column, and a washing-pipe arranged above the filter-bed in said column and terminating in a strainer, substantially as set forth.

3. The combination, with the outer casing or vessel and a column or chamber arranged within the chamber, closed at its bottom and open at its top, an inlet-pipe entering the bottom of said column, a discharge-pipe entering the bottom of the casing, a branch pipe connecting said discharge-pipe with the inlet-pipe and having a cock, and a sediment-pipe entering the top of the outer casing, substantially as set forth.

4. The combination, with the outer casing having an outlet-pipe and a column arranged in the casing, closed at its bottom and open at its top, of an inlet-pipe connected with the column, and a coagulant receptacle or chamber arranged above the column and having a discharge-opening, whereby the coagulant is delivered into the water in the column, substantially as set forth.

5. The combination, with the outer casing having an outlet-pipe and a column arranged in the casing, closed at its bottom and open at its top, of an inlet-pipe connected with the column, a coagulant receptacle or chamber arranged above the column and having a discharge-opening in its bottom, and a feed-pipe projecting into the column and communicating with the coagulant-receptacle, substantially as set forth.

6. The combination, with the outer casing having an outlet-pipe and a column arranged in the casing, closed at its bottom and open at its top, of an inlet-pipe connected with the column, a coagulant receptacle or chamber arranged above the column and having a discharge-opening in its bottom, and a distributer surrounding said opening, substantially as set forth.

7. The combination, with the outer casing having an inlet-pipe and a column arranged in the casing, closed at its bottom and open at its top, of an inlet-pipe connected with the column, a coagulant receptacle or chamber arranged above the column and having a discharge-opening in its bottom, a feed-pipe projecting into the column, and branch pipes communicating with the top of the coagulant-receptacle and connected with the feed-pipe outside of said receptacle, substantially as set forth.

8. The combination, with the outer vessel or casing and the column arranged therein, closed at its bottom and open at its top, of supply and discharge pipes connected, respectively, with the column and casing, and a coagulant bowl or chamber arranged in the casing above the column, projecting into the top of the column and separated from the latter by an annular discharge space or passage, substantially as set forth.

Witness my hand this 8th day of February, 1890.

JAMES CARTER.

Witnesses:
AMOS H. GARDNER,
WM. C. GREENE.